United States Patent [19]
Cox

[11] Patent Number: 5,277,103
[45] Date of Patent: Jan. 11, 1994

[54] PERSONAL COFFEE BREWING DEVICE
[75] Inventor: Steven J. Cox, Atlanta, Ga.
[73] Assignee: Melange International, Inc., Dallas, Tex.
[21] Appl. No.: 980,348
[22] Filed: Nov. 23, 1992
[51] Int. Cl.5 .............................................. A47J 31/18
[52] U.S. Cl. ..................... 99/323; 206/541; 206/549; 426/78; 426/79; 426/82; 426/112
[58] Field of Search ................. 99/295, 323; 206/223, 206/541, 546, 549; 426/77–; 222/129

[56] References Cited
U.S. PATENT DOCUMENTS

| | | |
|---|---|---|
| Re. 21,338 | 1/1940 | Haut . |
| 1,209,484 | 12/1916 | Peal . |
| 2,092,510 | 9/1937 | Haut . |
| 2,133,166 | 10/1938 | Fritsche . |
| 2,291,060 | 7/1942 | Schiess . |
| 3,154,418 | 10/1964 | Lovell et al. . |
| 3,287,806 | 11/1966 | Kellerman ............................ 426/112 |
| 3,342,518 | 9/1967 | Gorton, Jr. . |
| 3,428,460 | 2/1969 | Ely ...................................... 426/112 |
| 3,755,895 | 9/1973 | Claasen . |
| 3,946,652 | 3/1976 | Gorin ................................... 99/323 |
| 4,215,628 | 8/1980 | Dodd, Jr. ............................. 99/323 |
| 4,275,646 | 6/1981 | Barna .................................. 99/323 |
| 4,338,338 | 7/1982 | Popkes ................................. 426/82 |
| 4,465,697 | 8/1984 | Brice et al. .......................... 426/79 |
| 5,125,534 | 6/1992 | Rose et al. .......................... 426/112 |

FOREIGN PATENT DOCUMENTS
480596 2/1938 United Kingdom .................. 99/323

Primary Examiner—Harvey G. Hornsby
Assistant Examiner—Mark Spisich
Attorney, Agent, or Firm—Armstrong, Teasdale, Schlafly & Davis

[57] ABSTRACT

A personal coffee brewing device for brewing individual servings of coffee, the device including an open frame for holding a porous coffee-containing pouch. The frame is sized to fit within a standard coffee cup so that the frame can be stirred within the coffee cup to force hot water through a pouch held in the frame to brew a cup of coffee. The device also includes a handle extending from the frame, the handle having at least one chamber for containing condiments such as sweetener or artificial creamer. A closure at the end of the handle closes the chamber. The handle is preferably formed in two sections, with a removable condiment dispenser at the end of the handle, containing two chambers.

13 Claims, 1 Drawing Sheet

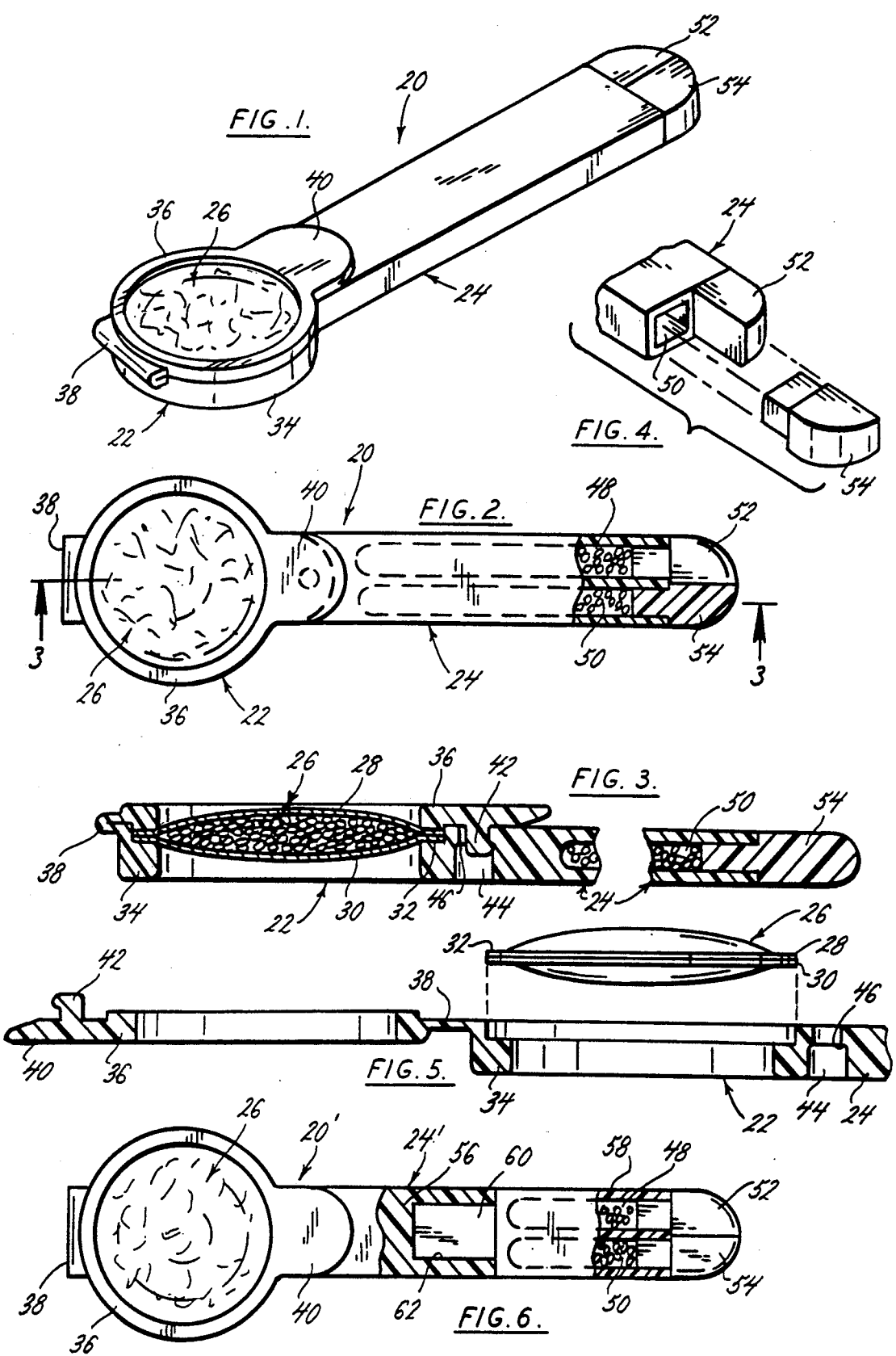

PERSONAL COFFEE BREWING DEVICE

BACKGROUND AND SUMMARY OF THE INVENTION

This invention relates to personal coffee brewing device for use in brewing and serving individual servings of coffee.

Coffee has traditionally been brewed by the pot, which is wasteful when only a few servings are needed. Moreover, the demand for individual servings of coffee is increasing with the popularity of "gourmet" flavored coffees, differing preferences for flavors and blends. Serving coffee can be cumbersome and messy, requiring the provision sweetener, creamer, and stirrers, and frequently results in waste and spillage.

What has been needed is some way to provide individual portions of fresh brewed coffee, complete with sweetener and creamer, with a maximum of flexibility and a minimum of effort and waste all in a completely disposable container. The personal coffee brewing device of the present invention meets this need, by providing for the brewing of individual servings of coffee. Generally, the personal coffee brewing device of the present invention comprises an open frame for holding a porous coffee-containing pouch. The frame is generally sized sufficiently smaller than a standard coffee cup that it can be inserted into the cup and stirred vigorously so that hot water in the cup circulates through the frame and the coffee-containing pouch. A handle extends from the frame, to hold the device. The handle is sufficiently long that it can be comfortably held by the user while the frame is immersed in hot water in the cup. The handle has at least one chamber for containing condiments such as sweetener or artificial creamer, and a closure at the end of the handle for closing the chamber.

The coffee-filled pouch can be provided in the frame, or the frame can be empty to allow the user to select the type of coffee to brew. There are preferably two chambers in the handle, so that the device provides both sweetener and creamer, and thus is completely self contained. These two chambers can be removed (separated) from the handle, allowing the user to add his/her choices of sweetner and creamer to the brewing cup of coffee while the frame is still submerged in hot water. This simplifies serving since no separate provision need be made for sweetener or creamer. The handle can be made in two sections, with the condiments provided in a detachable section to facilitate their use.

Thus the personal coffee brewing device allows the user to quickly brew a fresh cup of coffee of the user's selection. The user is treated to fresh coffee, rather than coffee that may have been sitting in a pot for hours, and the user can chose the flavor or type of coffee. The device greatly simplifies serving coffee, eliminating -the need to separately provide sweetener or creamer, and the resulting waste and mass. The device allows the user to make a gourmet cup of coffee in places when one would not normally be able to do so, for example while camping, boating, traveling, etc. These and other features and advantages of the invention will be in part apparent, and in part pointed out hereinafter.

BRIEF DESCRIPTION OF THE DRAWINGS

FIG. 1 is a perspective view of a first embodiment of a personal coffee brewing device constructed according to the principles of this invention, with a coffee pouch installed therein;

FIG. 2 is a top plan view of the personal coffee brewing device, with portions of the handle broken away;

FIG. 3 is a longitudinal cross-sectional view of the device, taken along the plane of line 3—3 in FIG. 2;

FIG. 4 is a partial perspective view of the end of the handle, showing the caps for the chambers in the handle;

FIG. 5 is an enlarged, partial longitudinal cross-sectional view of the device, with the frame open to receive a coffee pouch; and FIG. 6 is a top plan view of a second embodiment of a personal coffee brewing device constructed according to the principles of this invention, with portions of the handle broken away.

Corresponding reference numerals indicate corresponding parts throughout the several views of the drawings.

DETAILED DESCRIPTION OF THE PREFERRED EMBODIMENTS

A first embodiment of a personal coffee brewing device constructed according to the principles of this invention is indicated generally as 20 in FIGS. 1–5. The personal coffee brewing device 20 comprises a frame 22 and a handle 24. The frame is open and is adapted to hold a porous, coffee-filled pouch 26 therein. As shown in FIG. 5, the coffee-filled pouch 26 preferably comprises a premeasured charge of ground coffee secured between two plies of a water-permeable material 28 and 30, with a surrounding edge 32 adapted to be engaged by the frame 22. The frame 22 is preferably sized and shaped to fit easily within a standard coffee cup, so that the device can be inserted into the coffee cup and stirred vigorously to circulate hot water through the frame and the coffee-filled pouch to brew an individual serving of coffee.

The frame 22 preferably comprises first and second frame members 34 and 36, that are connected with a hinge 38. The device 20 can be made from molded plastic, in which case the hinge 38 can be an integral plastic living hinge. As shown in the Figures, the frame members are preferably large, round, loops. The frame members 34 and 36 can be releasably secured together to sandwich the edge 32 of the pouch 26 between them. The frame members 34 and 36 are preferably configured to snap-fit together. For example the member 34 can be provided with a tab 40 having a catch 42 thereon. The catch 42 is adapted to be received in a stepped opening 44 in the handle 24, and engage a shoulder 46 formed in the stepped opening. Of course, some other releasable engaging means could be provided to releasably secure the frame members.

The device 20 can be provided with a pouch 26 in the frame 22, in which case the pouch could be permanently secured in the frame, and the device can be disposed of after use. The device 20 can also be provided with the frame 22 empty, so that the user can select the type of coffee, and install the appropriate pouch 26 in the frame by snapping the frame members 34 and 36 together to sandwich the edge 32 of the pouch 26 between them.

The handle 24 is sufficiently long that in can be conveniently held by the user while frame 20 is immersed in hot water in the cup. The handle 24 preferably includes at least one, and preferably two chambers 48 and 50 adapted to hold coffee condiments such as a sweetener and an artificial creamer. These condiments are preferably in granular form, but could be in liquid form, if desired. Caps 52 and 54 are provided to close the chambers 48 and 50, respectively. The caps 52 and 54 have a smooth, quarter-circle configuration so that when they are both installed in the end of the handle they form a smooth end for the handle.

A second embodiment of the personal coffee brewing device is indicated generally as 20' in FIG. 6. The device 20' is substantially similar to the device 20, described above, and corresponding parts are identified with corresponding reference numerals. However, as shown in FIG. 6, in device 20', the handle 24' preferably comprises a first section 56 attached to the frame, and a second section 58, releasably attached to, and extending from, the first section. One of the sections can be provided with a stud, and the other of the sections can be provided with a mating socket, to releasably connect the sections. In this second preferred embodiment, the second section 58 has a stud 60 and the first section 56 has a socket 62. The chambers 48 and 50 are located in the second section 58, and thus can be separated from the handle 24 to facilitate adding condiments to the coffee.

OPERATION

In operation, the device 20 or 20' can be provided already charged with a pouch 26 of coffee, or the user can select and install a pouch 26 in the frame 22 between the first and second frame members 34 and 36. The user then inserts the device 20 into a coffee cup, and pours hot water into the cup, through the frame 22 and through the coffee-filled pouch 26 held in the frame. The user can stir the device 20 or 20' to facilitate the infusion of coffee in the water. Alternatively, the device can be inserted into a cup full of hot water, and stirred. When the cup is fully brewed, the user can remove the end caps 52 and 54, of device 20, or remove the second section 58 of the handle 24' of the device 20', to add sweetener and creamer from the chambers 48 and 50 as desired. The device can be used to stir the coffee.

Thus, the device allows the user to brew a fresh cup of coffee of the user's choosing, and add sweetener or sugar as desired. The device can be individually packaged with a coffee pouch installed and filled with sweetener and creamer, so that it is completely self-contained. After use, it can simply be thrown away. Alternatively, the device can be reused by opening the frame, and disposing of the pouch 26. A new pouch can be installed when needed, and the chambers 48 and 50 can be refilled when they are empty.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A personal coffee brewing device for brewing individual servings of coffee, the device comprising:
   (a) a frame adapted to hold a porous coffee-containing pouch, the frame sized to fit within a standard coffee cup so that the frame can be stirred within the coffee cup to force hot water contained in the cup though the pouch held in the frame to brew a cup of coffee;
   (b) an elongated handle extending from the frame and having a proximal end attached to the frame and an opposite distal end, the handle having at least one chamber therein for containing condiments, each said at least one chamber having an opening at the distal end of the handle and a removable closure for the opening at the distal end of the handle for closing the chamber and permitting selective dispensing of the contents of the chamber.

2. The personal coffee brewing device according to claim 1 wherein the frame comprises first and second frame members hingedly connected together that can be releasably closed to secure the porous coffee containing pouch between them.

3. The personal office brewing device according to claim 1 wherein there are at least two chambers in the handle, each having an opening at the distal end of the handle, and wherein each chamber has a separate closure.

4. The personal coffee brewing device according to claim 1 wherein the handle comprises a first section integral with the frame, and a second section releasably connectable to the first section, and wherein the at least one chamber is in the second section of the handle.

5. The personal coffee brewing device according to claim 4 wherein there are at least two chambers in the second section, and wherein each chamber has a separate closure.

6. The personal coffee brewing device according to claim 4 wherein one of the first and second sections has a socket, and the other of the first and second sections has a stud, which interfit to releasably secure the first and second sections together.

7. A personal coffee brewing device for brewing individual servings of coffee, the device comprising:
   (a) a frame adapted to hold a porous coffee-containing pouch, the frame sized to fit within a standard coffee cup so that the frame can be stirred within the coffee cup to force hot water contained in the cup though the pouch in the frame to brew a cup of coffee;
   (b) an elongated handle extending from the frame for use in holding the device and having a proximal end attached to the frame and an opposite distal end; and
   (c) a condiment container, releasably attached to the distal end of the handle, and having at least one chamber therein for holding condiments, and a removable closure for the at least one chamber in the container for permitting selective dispensing of the contents of the chamber.

8. The personal coffee brewing device according to claim 7 wherein there are two chambers in the condiment container, one for containing sweetener and one for containing artificial creamer.

9. The personal coffee brewing device according to claim 7 wherein the frame comprises first and second frame members hingedly connected together that can be releasably closed to secure the porous coffee-containing pouch between them.

10. The personal coffee brewing device according to claim 9 wherein each frame member comprises a closed loop which are adapted to sandwich the margins of a coffee-containing pouch between them.

11. The personal coffee brewing device according to claim 10 wherein the frame members are generally circular.

12. A personal coffee brewing device for brewing and serving individual servings of coffee, the device comprising:
- a frame adapted to hold a porous coffee containing pouch;
- an elongated handle extending from the frame for use in holding the device, the handle comprising a first section extending from the frame and a second section having a proximal end removably attached to the first section and a distal end opposite the proximal end, at least one chamber in the second section for holding and/or condiments, each said at least one chamber having an opening at the distal end of the second section and a removable closure for removably closing the opening of each chamber and permitting selective dispensing of the contents of the chamber.

13. The personal coffee brewing device according to claim 12 wherein there are at least two chambers in the second section, and a removable closure for each chamber.

* * * * *